(12) United States Patent
Iuchi et al.

(10) Patent No.: US 11,932,968 B2
(45) Date of Patent: Mar. 19, 2024

(54) AUTOMATED PROCESS FOR SILK FIBROIN EXTRACTION

(71) Applicants: Trustees of Tufts College, Medford, MA (US); Canon Virginia, Inc., Newport News, VA (US)

(72) Inventors: Kenichiro Iuchi, Newport News, VA (US); Thomas Wheeless, Newport News, VA (US); Samuele Battah, Newport News, VA (US); Fiorenzo G. Omenetto, Lexington, MA (US)

(73) Assignees: Trustees of Tufts College, Medford, MA (US); Canon Virginia, Inc., Newport News, VA (US)

( * ) Notice: Subject to any disclaimer, the term of this patent is extended or adjusted under 35 U.S.C. 154(b) by 516 days.

(21) Appl. No.: 17/265,381

(22) PCT Filed: Aug. 5, 2019

(86) PCT No.: PCT/US2019/045178
§ 371 (c)(1),
(2) Date: Feb. 2, 2021

(87) PCT Pub. No.: WO2020/028918
PCT Pub. Date: Feb. 6, 2020

(65) Prior Publication Data
US 2021/0301424 A1  Sep. 30, 2021

Related U.S. Application Data

(60) Provisional application No. 62/714,472, filed on Aug. 3, 2018.

(51) Int. Cl.
*D01B 7/06* (2006.01)
*B25J 18/00* (2006.01)

(52) U.S. Cl.
CPC ............... *D01B 7/06* (2013.01); *B25J 18/00* (2013.01)

(58) Field of Classification Search
CPC ............... D01B 7/06; D01B 7/00; B25J 18/00
See application file for complete search history.

(56) References Cited

U.S. PATENT DOCUMENTS 8,287,913 B2  10/2012  Rheinnecker
9,599,891 B2 *  3/2017  Kaplan ............... C07K 14/435
(Continued)

FOREIGN PATENT DOCUMENTS

| CN | 104562640 A | 4/2015 | |
| CN | 107142524 A | 9/2017 | |
| WO | WO-2017106631 A1 * | 6/2017 | ........... B01D 61/243 |

OTHER PUBLICATIONS

International Searching Authority. International Search Report and Written Opinion for application PCT/US2019/045178, dated Oct. 11, 2019. 9 pages.

*Primary Examiner* — Tajash D Patel
(74) *Attorney, Agent, or Firm* — GTC Law Group PC & Affiliates

(57) ABSTRACT

The present disclosure provides a system and a method for automated extraction of silk fibroin from silk cocoons. The silk extraction system can include a boiling tank, a rinsing tank, and a rinse bowl attached to a robotic arm. The rinse bowl has a porous bottom surface adapted to retain an extracted silk fibroin. The robotic arm can move the rinse bowl between the boiling tank and the rinsing tank for separate stages of processing. A silk processing algorithm is executed by a processor to automate the process.

20 Claims, 6 Drawing Sheets

(56) References Cited

U.S. PATENT DOCUMENTS 10,933,173 B2 * 3/2021 Kaplan .................. A61P 43/00
2016/0376604 A1 12/2016 McCarty

* cited by examiner

AUTOMATED PROCESS FOR SILK FIBROIN EXTRACTION

CROSS-REFERENCE TO RELATED APPLICATIONS

This application is the national stage entry of International Application PCT/US2019/045178, filed Aug. 5, 2019, which is based on, claims priority to, and incorporates herein by reference in its entirety, U.S. Provisional Patent Application Ser. No. 62/714,472, filed on Aug. 3, 2018 and entitled Automated Process for Silk Fibroin Extraction.

STATEMENT REGARDING FEDERALLY SPONSORED RESEARCH

Not applicable.

BACKGROUND

The field of the disclosure is an extraction process. More particularly, the disclosure relates to an automated process for making aqueous silk fibroin solutions.

Silk is a well described natural fiber and has been used traditionally in the form of threads in textiles for thousands of years. Recently, the unique mechanical properties of reprocessed silk such as fibroin and its biocompatibility make the silk fibers especially attractive for use in biotechnological materials and medical applications.

During the silk fibroin extraction process, silk cocoons are boiled in a solution to extract silk fibroin from the silk cocoons. It is critical to precisely manage boiling time of the silk cocoons and the temperature of the solution. On a small scale, such extraction process is easy to execute. When the process is scaled up, precisely controlling the silk fibroin process becomes more difficult. Currently there is no system that specifically designed for automatically extracting silk fibroin. Therefore, a system with an algorithm that is designed specifically for extracting silk fibroin in an automated fashion is desirable.

SUMMARY

In one aspect, the present disclosure provides a system for automated extraction of silk fibroin from silk cocoons. The system includes a rinse bowl, a robotic arm, a first boiling tank, a first rinsing tank, a power supply, a processor, and a memory. The rinse bowl has a porous bottom surface. The rinse bowl has a rinse bowl volume. The porous bottom surface includes a plurality of openings adapted to drain the silk fibroin during the squeezing of the silk fibroin prior to exiting the boiling or rinsing tank. The robotic arm is coupled to the rinse bowl such that the robotic arm moves the rinse bowl. The first boiling tank has a boiling tank top opening and a first temperature regulator. The first boiling tank is adapted to contain a first boiling solution adapted for degumming silk cocoons. The first temperature regulator is adapted to elevate a temperature of the first boiling solution when present in the first boiling tank to a boiling temperature. The first boiling tank is adapted to receive the rinse bowl via the boiling tank top opening. The first rinsing tank includes a rinsing tank top opening. The first rinsing tank is adapted to contain a first rinsing liquid adapted for rinsing degummed silk. The first rinsing tank is adapted to receive the rinse bowl via the rinsing top opening. The power supply is coupled to the robotic arm and the first temperature regulator. The processor is in electronic communication with the robotic arm and the first temperature regulator. The memory is accessible by the processor and has stored thereon a silk processing algorithm. The silk processing algorithm, when executed by the processor, causes the processor to: a) send an increase boiling tank temperature to boiling signal to the first temperature regulator; b) send a move rinse bowl to boiling tank signal to the robotic arm; c) after a pre-determined boiling time, send a move rinse bowl to rinsing tank signal to the robotic arm; and d) after a pre-determined rinsing time, send a remove rinse bowl from rinsing tank signal to the robotic arm. The robotic arm moves the rinse bowl into the boiling tank in response to receiving the move rinse bowl to boiling tank signal. The first temperature regulator increases a temperature of the first boiling solution present in the first boiling tank in response to receiving the increase boiling tank temperature to boiling signal. The robotic arm moves the rinse bowl from the boiling tank into the rinsing tank in response to receiving the move rinse bowl to rinsing tank signal. The robotic arm removes the rinse bowl from the rinsing tank in response to receiving the remove rinse bowl from rinsing tank signal.

In another aspect, the present disclosure provides a method. The method includes the following steps: a) receiving a user input indicating a desire to initiate an automated extraction of silk fibroin from silk cocoons; and b) in response to step a), initiating the silk processing algorithm described herein.

The foregoing and other aspects and advantages will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

It is to be understood that the invention is not limited to the particular embodiments described. It is also to be understood that the terminology used herein is for the purpose of describing particular embodiments only, and is not intended to be limiting. As used herein, the singular forms "a", "an", and "the" include plural embodiments unless the context clearly dictates otherwise.

Specific structures, devices and methods relating to modifying biological molecules are disclosed. It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements. When two or more ranges for a particular value are recited, this disclosure contemplates all combinations of the upper and lower bounds of those ranges that are not explicitly recited. For example, recitation of a value of between 1 and 10 or between 2 and 9 also contemplates a value of between 1 and 9 or between 2 and 10.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs may be stored and/or data communications may be buffered. The term "memory" may also include other types of memory or combinations thereof.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

The various aspects may be described herein in terms of various functional components and processing steps. It should be appreciated that such components and steps may be realized by any number of hardware components configured to perform the specified functions.

Systems

Figure 1:
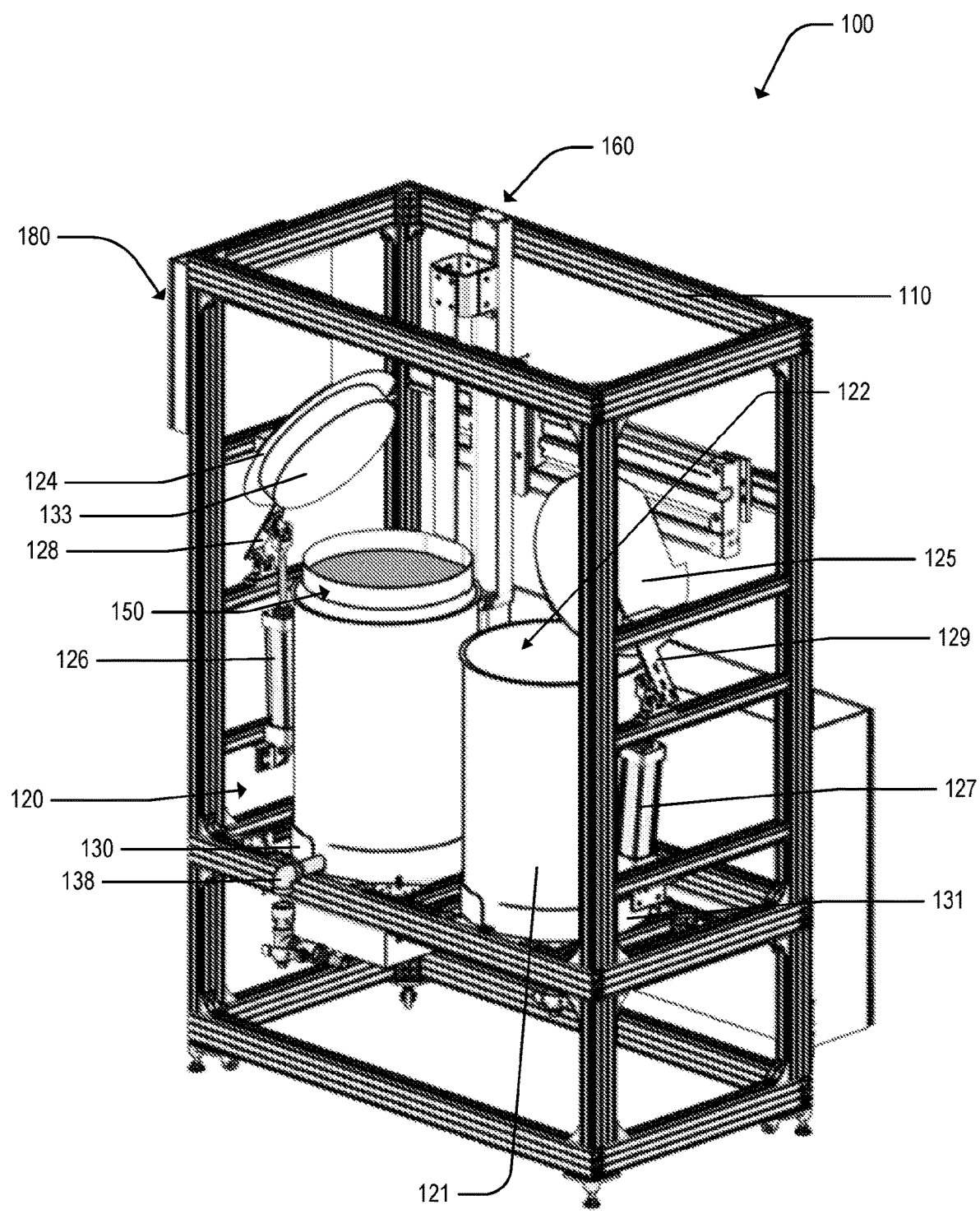
FIG. 1 shows the perspective view of an automated system for extracting silk fibroin from silk cocoons, in accordance with an aspect of the present disclosure.
Figure 2:
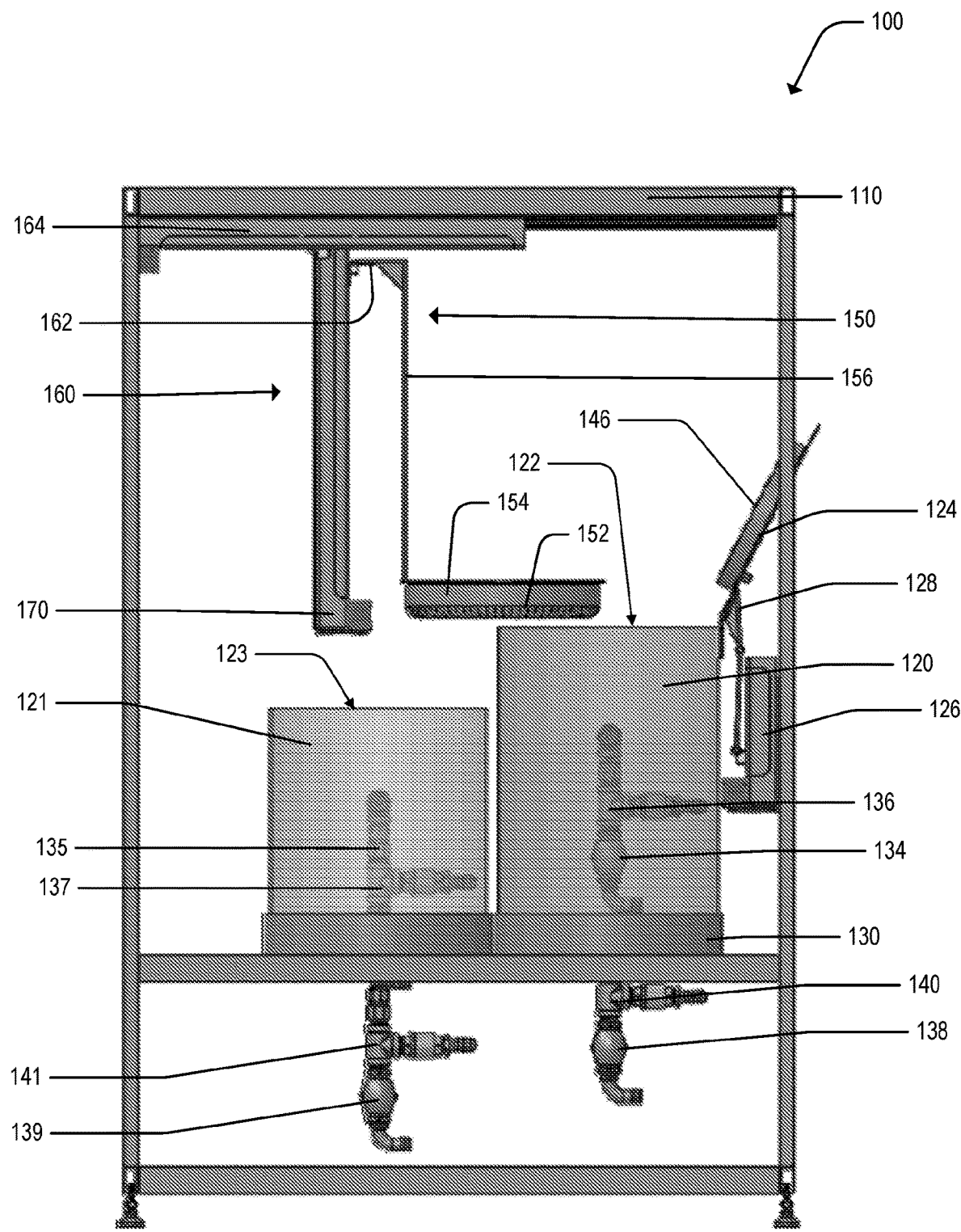
FIG. 2 shows the side view of the automated system for extracting silk fibroin from silk cocoons, in accordance with an aspect of the present disclosure

This disclosure provides systems. The systems can be suitable for use with the methods described herein. When a feature of the present disclosure is described with respect to a given system, that feature is also expressly contemplated as being combinable with the other systems, the methods, and the kits described herein, unless the context clearly dictates otherwise Referring to FIGS. 1-2, the present disclosure provides a system 100 for extracting silk fibroin from silk cocoons in an automated fashion. The system includes an optional housing structure 110, at least one boiling tank 120, such as one, two, three, four or more boiling tanks, at least one rinsing tank 121, such as one, two, three, four or more rinsing tanks, a rinse bowl 150, a robotic arm 160, and a controller 180.

Figure 3:
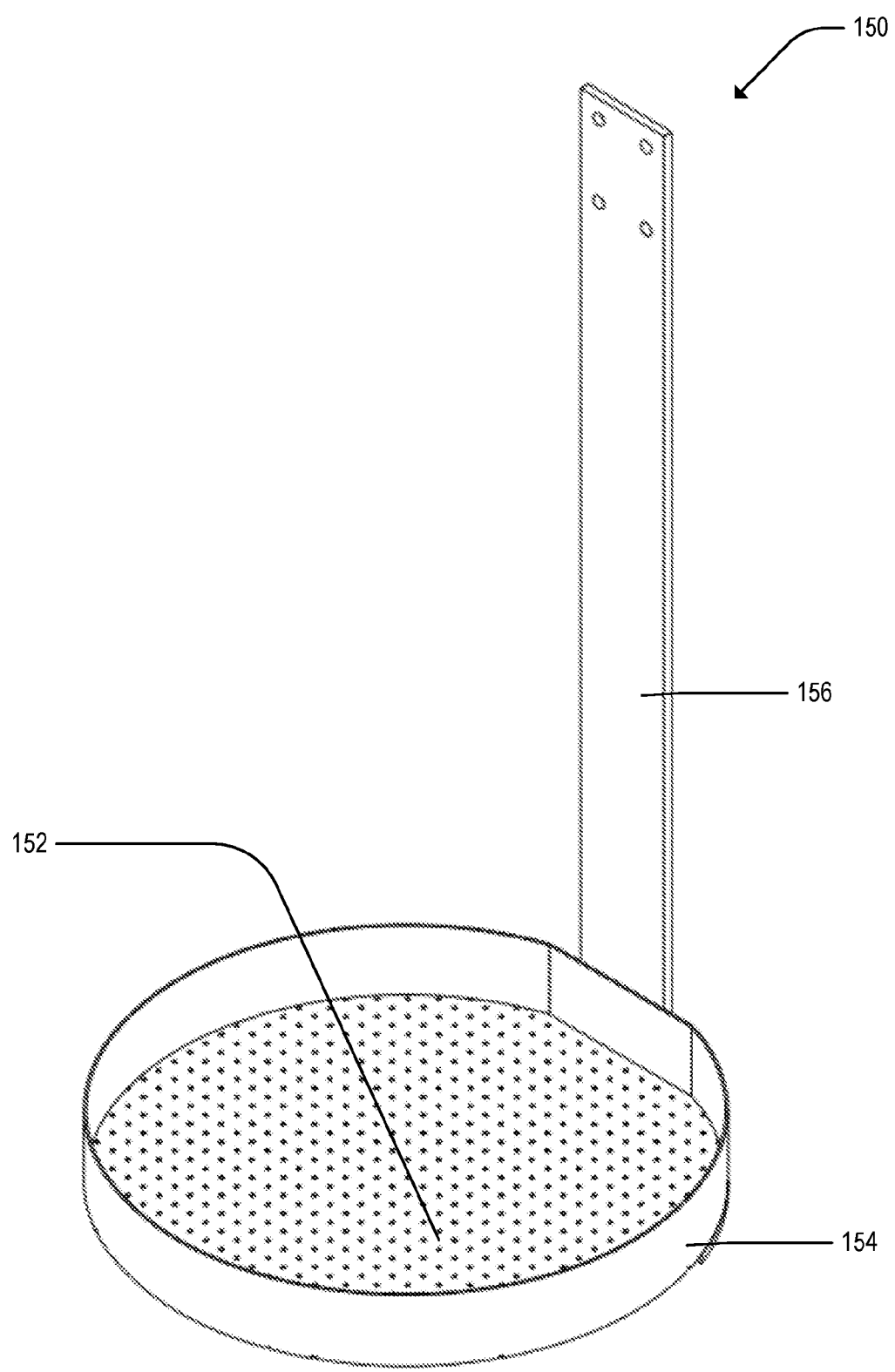
FIG. 3 is an image of a rinse bowl, in accordance with an aspect of the present disclosure.

Referring to FIG. 3, the rinse bowl 150 is shown in isolation. The rinse bowl 150 includes a porous bottom surface 152 and at least one peripheral wall 154. The rinse bowl 150 defines a rinse bowl volume (i.e., the space that is occupied within the rinse bowl 150). The porous bottom surface 152 includes a plurality of openings adapted to support the extracted silk fibroin within the rinse bowl volume. The porous bottom surface 152 is adapted to drain the extracted silk fibroin during exiting the boiling and rinsing tanks due to the squeezing action by protrusions discussed elsewhere herein. The rinse bowl 150 can include a handle 156 for coupling to the robotic arm 160.

In some aspects, the housing structure 110 can be configured to support the boiling tank 120, the rinsing tank 121, the rinse bowl 150, the robotic arm 160 and the controller 180. The housing structure 110 can include a boiling tank pedestal 130 for supporting the boiling tank 120. The housing structure 110 can include a rinsing tank pedestal 131 for supporting the rinsing tank 121.

The boiling tank 120 can take a variety of physical forms, so long as the functions described herein remain achievable. In some cases, the boiling tank 120 is substantially cylindrical in shape. The boiling tank 120 can have a boiling tank top opening 122, which affords access to an interior volume of the boiling tank 120.

The boiling tank 120 includes a first temperature regulator 132. In some cases, the first temperature regulator 132 is a heating element.

The boiling tank 120 can have an inner shape that is adapted to receive the rinse bowl 150 in a fashion that maintains a uniform gap between the rinse bowl 150 and the inner surface of the boiling tank 120.

The boiling tank 120 can include a boiling tank cover 124. The boiling tank cover 124 has a protrusion 133 extending from the one surface of the cover 124 and generally facing toward the interior of the boiling tank 120. The boiling tank cover 124 is connected to a boiling tank cover actuator 126 through a bridge 128, such that the boiling tank actuator 126 controls movement of the cover 124. The cover 124 can be configured to have a first opened position and a second closed position relative to the boiling tank 120. The boiling tank cover 124 is capable of moving between the first opened position and the second closed position via the boiling tank cover actuator 126. In some aspects, the boiling tank cover actuator 126 can be configured in a variety of ways, including but not limited to, a hydraulic arm, a pneumatic arm, a stepper motor arm, the like, or combinations thereof.

The boiling tank cover actuator 126 can automatically move in response to receiving a signal. In response to receiving a boiling tank cover open signal, the boiling tank cover actuator 126 can move the boiling tank cover 124 to the open position. In response to receiving a boiling tank cover close signal, the boiling tank cover actuator 126 can move the boiling tank cover 124 to the closed position.

The boiling tank can further include an inlet 134, an inlet valve 136, an outlet 138, an outlet valve 140, and a temperature sensor 142. The inlet valve 136 and the outlet valve 140 can be remote controllable via electronic signal in ways understood to those having ordinary skill in the control valve arts, including solenoid valves. The inlet valve 136 and outlet valve 140 can be in electronic communication with the processor, thereby enabling automated control. The inlet valve 136 and outlet valve 140 (and the inlet valve 137 and outlet valve 141 discussed below) can follow simple open and close commands to open and close, thereby allowing fluid communication into and out of respective tanks.

The boiling tank 120 can be configured to contain a liquid suitable for a silk boiling process. An inner surface of the boiling tank 120 is chemically and biologically inert with respect to silk fibroin extraction process. In some aspects, the liquid can enter the boiling tank 120 through the inlet 134 wherein the flow is controlled by the inlet valve 136. The liquid can be drained from the boiling tank 120 through the outlet 138 wherein the flow is controlled by the outlet valve 140. A boiling solution source can be coupled to the boiling tank 120 via the inlet 134 and inlet valve 136, thereby enabling automated filling and refilling of the boiling tank 120. The outlet 140 can be coupled to a drain or a solution recycling system.

The temperature sensor 142 can monitor the liquid temperature within the boiling tank 120, and is in electronic communication with processor 180. The processor 180 can utilize readings from the temperature sensor 142 to accurately control the temperature regulator 132. The temperature regulator 132 contains necessary elements to heat up or cool down the liquid within the boiling tank 120. In some aspects, the temperature regulator can be configured in a variety of ways, including but not limited to, a coil, a jacket, or a combination thereof.

The rinsing tank 121 can have substantially identical features to the boiling tank 120, unless the context clearly dictates otherwise. For example, the temperature regulator 132 and temperature sensor 142 need not be present in the rinsing tank 121, though they are suitable present in some embodiments. The rinsing tank has a rinsing tank top opening 123, rinsing tank cover 125 (including a protrusion that is similar to the protrusion 133 on the boiling tank cover 124, but which is not illustrated), a rinsing tank cover actuator 127, a bridge 129, an inlet 135, an inlet valve 137, an outlet 139, and an outlet valve 141, with arrangements and constructions being substantially similar to those described above in relation to the boiling tank 120. The rinsing tank 121 is adapted to contain a first rinsing liquid for rinsing degummed silk fibroin (i.e., for rinsing the silk fibroin after removal from the boiling tank 120). The rinsing tank inlet 135 can be coupled to a rinsing liquid source, such as a source of deionized water. The rinsing tank outlet 139 can be coupled to a drain or liquid recycling system.

The boiling and rinsing tanks 120 & 121 can each have volumes of at least 1 L, at least 5 L, at least 10 L, at least 15 L, at least 20 L, at least 25 L, at least 30 L, at least 40 L, at least 50 L, or at least 60 L and at most 1000 L, at most 750 L, at most 500 L, at most 400 L, at most 300 L, at most 200 L, or at most 100 L.

The rinsing tank cover actuator 127 can automatically move in response to receiving a signal. In response to receiving a rinsing tank cover open signal, the rinsing tank cover actuator 127 can move the rinsing tank cover 125 to the open position. In response to receiving a rinsing tank cover close signal, the rinsing tank cover actuator 127 can move the rinsing tank cover 125 to the closed position.

The rinse bowl 150 is adapted to hold silk cocoons prior to being introduced into the boiling tank 120. The rinse bowl 150 can be adapted to hold at least 50 g, 100 g, 150 g, 250 g, 500 g, 1 kg, or more of silk cocoons. The rinse bowl 150 is adapted to retain the extracted silk fibroin within its volume. The porous bottom surface 152 can function effectively as an agitating mechanism to force the cocoons to submerge during the boiling process to enable a uniform exposure to the boiling solution and during the rinsing steps to achieve a thorough rinsing action.

Silk cocoons can be introduced into the system in a variety of ways. In one case, The robotic arm 160 is coupled to the rinse bowl 150. In some cases, the rinse bowl 150 is affixed to the robotic arm 160 in a permanent or semi-permanent fashion. In some cases, the rinse bowl 150 is selectively couple to the robotic arm 160 to enable picking up a rinse bowl 150 and setting down a rinse bowl 150. The selective coupling can be manual (i.e., a hand or other automated gripping feature can grab and release the rinse bowl 150), magnetic, or other selective coupling known to those having ordinary skill in the art.

The robotic arm 160 is configured to control movement of the rinse bowl 150 based on the receipt of signals from the processor 180. In response to receiving a move rinse bowl to boiling tank signal, the robotic arm 160 moves the rinse bowl 150 into the boiling tank 120 via the top opening 122. In response to receiving a move rinse bowl to rinsing tank signal, the robotic arm 160 moves the rinse bowl 150 into the rinsing tank 121 via the top opening 123. In some cases, this involves first removing the rinse bowl 150 from the boiling tank 120. In response to receiving a remove rinse bowl from rinsing tank signal, the robotic arm 160 removes the rinse bowl 150 from the rinsing tank 121. The robotic arm can be designed to move to a rinse bowl source location to selectively couple to a new rinse bowl. The robotic arm 160 can be designed to move to a rinse bowl destination location at the end of the extraction process. In some cases, the robotic arm 160 can be adapted to invert the rinse bowl 150 at the rinse bowl destination location in order to empty the contents of the rinse bowl 150. In other cases, an extractor, such as a suction pump, can remove the contents of the rinse bowl 150.

Multiple robotic arms 160 are contemplated, though not illustrated. The system 100 can be designed for massively parallel operation, with one or more robotic arms 160 operating multiple iterations of the system 100 described herein.

The power supply (not illustrated) is coupled to the robotic arm 160 and the temperature regulator 132. The power supply can be an individual power supply or a series of separate power supplies. The power supply can also be coupled to any other features of the system 100 that require power.

The processor 180 is capable of receiving and sending signals, as described herein.

The memory (not illustrated) has a silk processing algorithm stored thereon. The memory can be non-transitory and computer-readable. The memory is accessible by the processor 180.

The silk processing algorithm can be accessed and executed by the processor 180. The basic function of the silk processing algorithm is, when executed by the processor 180, as follows: a) send an increase boiling tank temperature to boiling signal to the first temperature regulator 142 (thereby causing the first temperature regulator 142 to elevate a temperature of the solution within the boiling tank 120 to boiling); b) send a move rinse bowl to boiling tank signal to the robotic arm 160 (thereby causing the robotic arm 160 to move the rinse bowl 150 into the boiling tank 120); c) after a pre-determined boiling time, send a move rinse bowl to rinsing tank signal to the robotic arm 160 (thereby causing the robotic arm 160 to move the rinse bowl 150 from the boiling tank 120 to the rinsing tank 121); and d) after a pre-determined rinsing time, send a remove rinse bowl from rinsing tank signal to the robotic arm 160 (thereby causing the robotic arm 160 to remove the rinse bowl 150 from the rinsing tank 121).

The silk processing algorithm can also contain a variety of additional features, which can support further automation of the process or more accurate control over the process. In one case, the silk processing algorithm can control the covers 124 & 125. The silk processing algorithm can, when executed by the processor 180, further cause the processor to: b1) after step b) and after the robotic arm 160 has move the rinse bowl 150 into the boiling tank 120, send the boiling tank cover close signal to the boiling tank cover actuator 126; and b4) prior to step c), send the boiling tank cover open signal to the boiling tank cover actuator 126. This closes the boiling tank cover 124 while the rinse bowl 150 is within the boiling tank 120 and opens the boiling tank cover 124 to remove the rinse bowl 150 from the boiling tank 120. Similar steps can be deployed for closing and opening the rinse tank cover 125 after introducing the rinse bowl 150 to the rinsing tank 121 and before removing the rinse bowl 150 from the rinsing tank 121, respectively.

In another case, the silk processing algorithm can control the robotic arm 160 and optionally the covers 124 & 125 to extract liquid from silk fibroin contained within the rinse bowl 150. The silk processing algorithm can, when executed by the processor 180, further cause the processor to: b3) after steps a) and b1) and prior to step b4), send a boiling tank extraction signal to the robotic arm 160. In response to the boiling tank extraction signal, the robotic arm 160 moves the rinse bowl 150 toward the first boiling tank cover 124 to engage and/or retain a seal between the rinse bowl 150 and the protrusion 133 of the boiling tank cover 124. The movement toward the cover 124 continues, thereby reducing a sealed volume within the rinse bowl, thereby squeezing at least a portion of the contents of the rinse bowl out of the porous bottom surface 152. Similar steps can be deployed for extracting liquid from the rinse bowl 150 following rinsing in the rinsing tank 121, but prior to removal from the rinsing tank 121.

In another case, the silk processing algorithm can control the robotic arm to agitate the rinse bowl 150 to provide additional mixing. The silk processing algorithm can, when executed by the processor 180, further cause the processor to: b2) after step b), send a boiling tank agitation signal to the robotic arm 160. In response, the robotic arm 160 moves the rinse bowl 150 upward and downward at predefined speeds and distances, thereby agitating liquids contained in the rinse bowl volume of the rinse bowl 150. This agitation can be repeated at least 1, 2, 3, 4, 5, 6, 7, 8, 9, 10, 15, 20, 25, 30 or more times. Similar agitation can be directed and controlled when the rinse bowl 150 is located in the rinsing tank 121 via a rinsing tank agitation signal.

In another case, the silk processing algorithm can control the filling and discharge of the boiling tank 120 and rinsing tank 121. While the filling and discharge will be described in the context of the boiling tank 120, the function is similar with the rinsing tank 121. The silk processing algorithm can, when executed by the processor 180, further cause the processor to: 1a) prior to step a), send a fill boiling tank signal to the boiling tank inlet valve 136. In response, the boiling tank inlet valve 136 opens to provide fluid communication between a boiling tank solution source and the boiling tank. The boiling tank inlet valve 136 can then automatically close after: i) a predetermined length of time; ii) a predetermined volume has been measured in the boiling tank; or iii) a predetermined volume of fluid has passed through the boiling tank inlet. The silk processing algorithm can, when executed by the processor 180, further cause the processor to: c1) after step c), send an empty boiling tank signal to the boiling tank outlet valve 140. In response, the boiling tank outlet valve 140 opens to drain the boiling tank 120. Generally speaking, the solution in the boiling tank can be replaced every time a new iteration of the silk processing algorithm is initiated, every two iterations, every three iterations, etc., as would be appreciated by a person having ordinary skill in the silk processing arts. The rinsing tank 121 can be filled and emptied with a similar control process of the algorithm. However, the liquid in the rinsing tank should be refilled and emptied at least once, at least twice, at least 3, 4, 5, 6, 7, 8, 9, 10, or more times during a single iteration of the silk processing algorithm.

Figure 4:
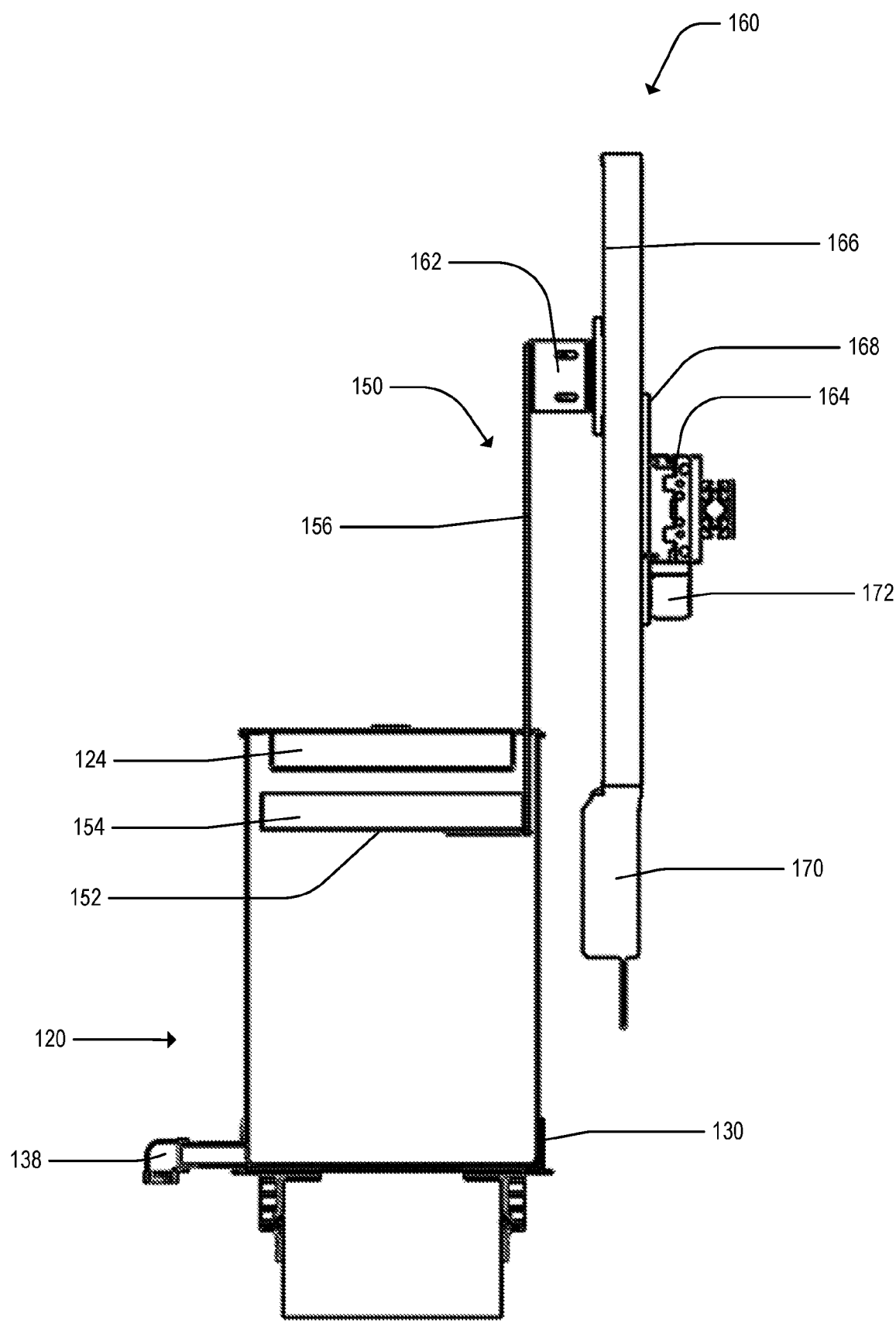
FIG. 4 is the side view of a boiling tank with a robotic arm, in accordance with an aspect of the present disclosure. The rinsing tank has a similar structure and many aspects are illustrated here with respect to the boiling tank.
Figure 5:
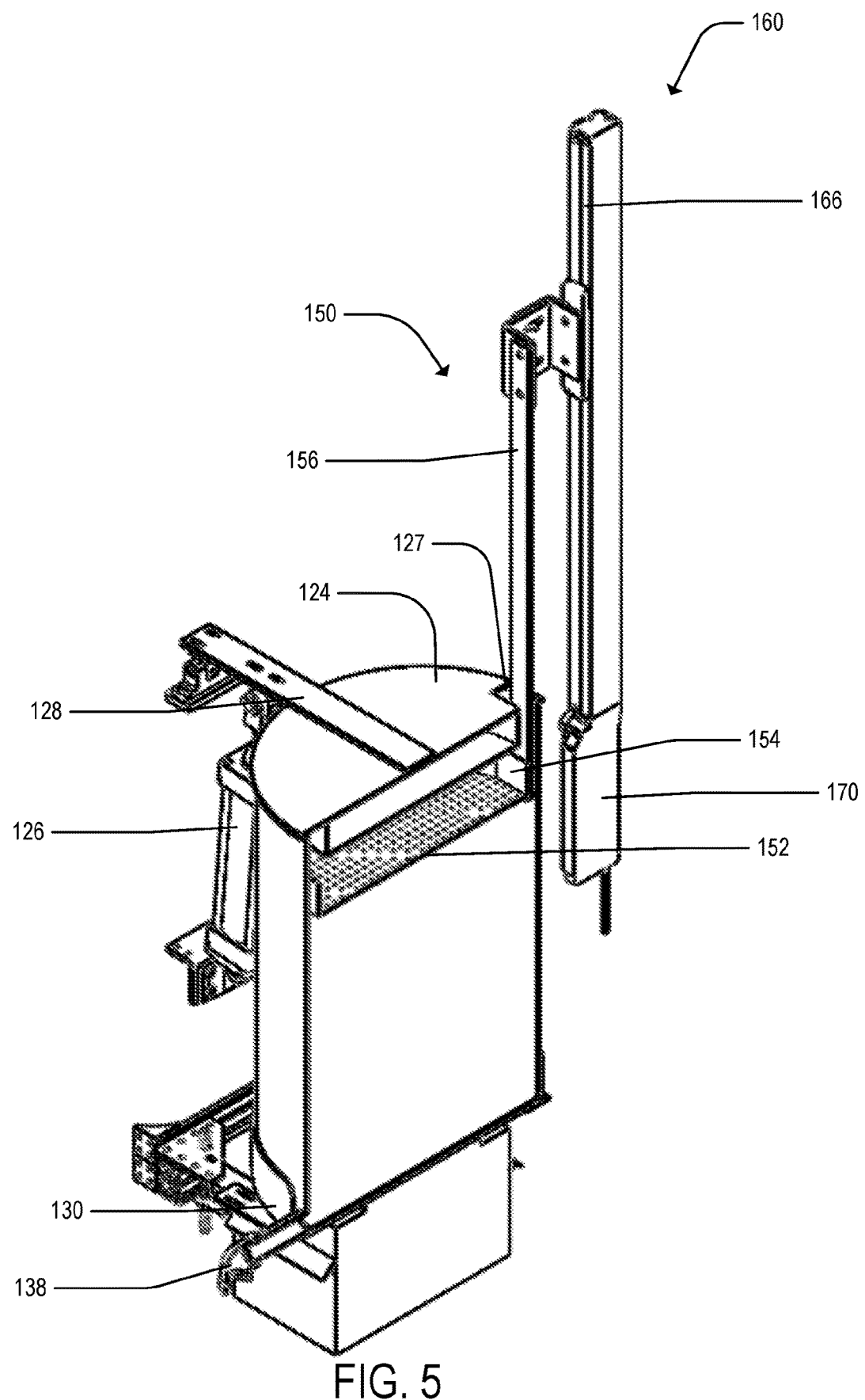
FIG. 5 is the cross-sectional view of a boiling tank with the robotic arm, in accordance with an aspect of the present disclosure. The rinsing tank has a similar structure and many aspects are illustrated here with respect to the boiling tank.
Figure 6:
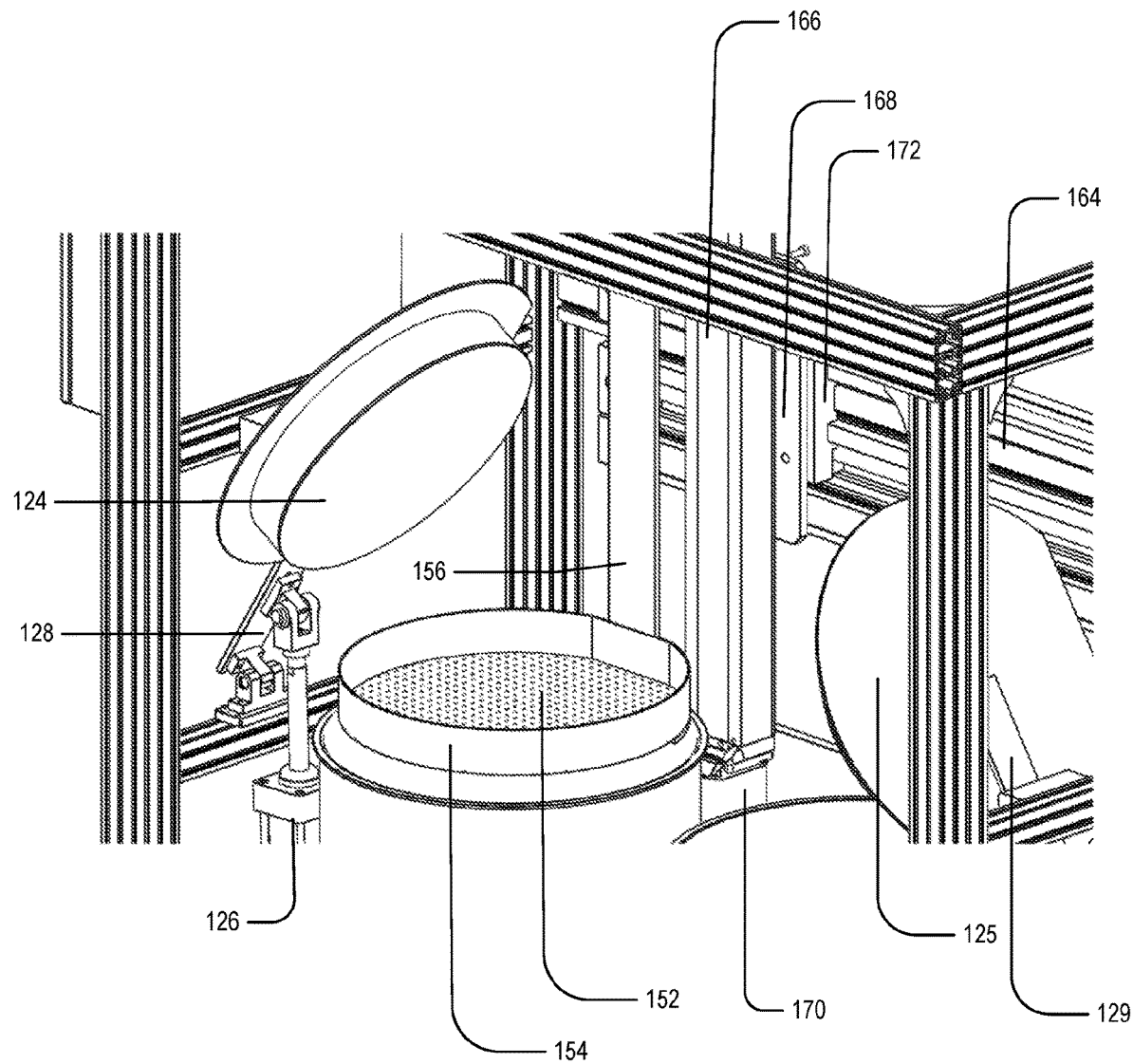
FIG. 6 is the close up view of the opening of the boiling tank that shows a tank body, a tank cover, a pneumatic arm attached to the housing structure and the tank cover, the rinse bowl and the robotic arm. The rinsing tank has a similar structure and many aspects are illustrated here with respect to the boiling tank.

Referring to FIGS. 4, 5 and 6, the boiling tank 120, the rinse bowl 150 and the robotic arm 160 are shown. In some aspects, the cover 124 have an opening 127 such that when the cover is in closed position, the robotic arm 150 is able to control the movement of the rinse bowl 150 inside the boiling tank 120. In the configuration shown in FIG. 6, the robotic arm 160 comprises a bridge that connects the robotic arm 160 and the rinse bowl 150. In one aspect, the robotic arm can include a horizontal track 164 attached to the side of the robotic arm 160. In one aspect, the robotic arm 160 includes a bridge 162 that connects the rinse bowl 150 to the robotic arm 160 such that the movement of rinse bowl 150 is coupled with the robotic arm. The robotic arms can further includes a vertical track 166, a docking assembly 168, a vertical motion drive unit 170 and a horizontal motion drive unit (not illustrated).

Information can be transmitted and received in wired or wireless interfaces known to those having ordinary skill in the signal transmission arts.

Various sensors can provide information regarding the state of the system 100, such as liquid level sensors, position sensors, and the like. A person having ordinary skill in the art in industrial system monitoring will appreciate that a wide variety of sensors can be deployed in the context of automated systems, such as the one described in the present disclosure.

Methods

This disclosure also provides a method. It should be appreciated that various methods are suitable for use with the other methods described herein. Similarly, it should be appreciated that various methods are suitable for use with the systems described elsewhere herein. When a feature of the present disclosure is described with respect to a given method, that feature is also expressly contemplated as being useful for the other methods and the systems described herein, unless the context clearly dictates otherwise.

The present disclosure provides a method of extracting silk fibroin from silk cocoons. The method includes: a) receiving a user input indicating a desire to initiate an automated extraction of silk fibroin from silk cocoons; and b) in response to step a), initiating the silk processing algorithm described above.

The chemistry associated with the silk processing described herein is understood by those having ordinary skill in the silk fibroin processing arts.

Example 1

150 g of *Bombyx mori* silk cocoons are placed on the rinse bowl. The boiling tank is an 80 L stainless steel tank equipped with a cover, an inlet valve with a valve control, an outlet with an outlet valve control, a temperature regulator, and a temperature sensor. During operation, 60 L of 0.02M $Na_2CO_3$ is added to the boiling tank. The $Na_2CO_3$ solution is then heated to boil around 100° C., wherein the temperature is monitored by the temperature sensor and maintained by the temperature regulator. The rinse bowl is lowered into the boiling tank such that the silk cocoons are fully submerged in the $Na_2CO_3$ solution. The boiling tank cover is then moved to a closed position and a boiling stage is initiated.

During the boiling stage, the rinse bowl is held at an original position, then raised up slowly for a distance of 3 inches then drop rapidly back to the original position to create a gentle agitation to silk fibroin in full contact with the boiling solution. The process is repeated for 30 minutes.

After 30 minutes, the boiling stage is completed. The rinse bowl is lifted up so that the rinse bowl is sealingly engaged with the protrusion of the boiling tank cover such that the silk fibroin is squeezed against the protrusion of the boiling tank cover to drain excess $Na_2CO_3$ solution. After squeezing, the boiling tank cover is moved to an open position and the rinse bowl is lifted out of the boiling tank.

The rinse bowl is then transferred into a 60 L stainless steel rinsing tank equipped with a cover, an inlet with an inlet valve, and an outlet with an outlet valve to begin the rinsing stage. 30 L DI water is added to the rinsing tank through the inlet valve. The rinse bowl is lowered into the rinsing tank to an original position such that the silk fibroin is fully submerged into the DI water. The rinsing tank cover is then moved to a closed position and a rinse stage is initiated.

During the rinsing stage, the rinse bowl is moved up from the original position slowly for 3 inches then move down fast to return to the original position. This process is repeated for 20 minutes. The outlet valve then opens the outlet to drain the DI water in the rinsing tank, while the rinse bowl is lifted up so that the rinse bowl is sealingly engaged with the protrusion of the rinsing tank cover such that the silk fibroin is squeezed against the protrusion of the rinsing tank cover to drain excess water. The rinse stage is repeated 2 more times for a total of 1 hour rinsing time.

After the rinsing stage, the rinsing tank cover is moved to an open position where the rinse bowl is lifted out of the rinsing tank such that the silk fibroin can be easily accessed and transferred for next stage processing. As one non-limiting example, the rinsed silk fibroin is stretched over a large sheet of aluminum foil and placed inside an exhaust hood to completely dry the silk fibroin.

The present disclosure has been described in terms of one or more preferred embodiments, and it should be appreciated that many equivalents, alternatives, variations, and modifications, aside from those expressly stated, are possible

We claim:

1. A system for automated extraction of silk fibroin from silk cocoons, the system comprising:
    a rinse bowl having a porous bottom surface, the rinse bowl having a rinse bowl volume, the porous bottom surface comprising a plurality of openings adapted to support the extracted silk fibroin within the rinse bowl volume;
    a robotic arm coupled to the rinse bowl such that the robotic arm moves the rinse bowl;
    a first boiling tank having a boiling tank top opening and a first temperature regulator, the first boiling tank adapted to contain a first boiling solution adapted for degumming the silk cocoons, the first temperature regulator adapted to elevate a temperature of the first boiling solution when present in the first boiling tank to a boiling temperature, the first boiling tank adapted to receive the rinse bowl via the boiling tank top opening;
    a first rinsing tank having a rinsing tank top opening, the first rinsing tank adapted to contain a first rinsing liquid adapted for rinsing degummed silk, the first rinsing tank adapted to receive the rinse bowl via the rinsing tank top opening;
    a power supply coupled to the robotic arm and the first temperature regulator;
    a processor in electronic communication with the robotic arm and the first temperature regulator; and
    a memory accessible by the processor and having stored thereon a silk processing algorithm that, when executed by the processor, causes the processor to:
    a) send an increase boiling tank temperature to boiling signal to the first temperature regulator;
    b) send a move rinse bowl to boiling tank signal to the robotic arm;
    c) after a pre-determined boiling time, send a move rinse bowl to rinsing tank signal to the robotic arm; and
    d) after a pre-determined rinsing time, send a remove rinse bowl from rinsing tank signal to the robotic arm,
    wherein the robotic arm moves the rinse bowl into the first boiling tank in response to receiving the move rinse bowl to boiling tank signal,
    wherein first temperature regulator increases a temperature of the first boiling solution present in the first boiling tank in response to receiving the increase boiling tank temperature to boiling signal,
    wherein the robotic arm moves the rinse bowl from the first boiling tank into the first rinsing tank in response to receiving the move rinse bowl to rinsing tank signal, and
    wherein the robotic arm removes the rinse bowl from the first rinsing tank in response to receiving the remove rinse bowl from rinsing tank signal.

2. The system of claim 1, wherein the extracted silk fibroin is retained within the rinse bowl volume.

3. The system of claim 1, wherein the robotic arm is selectively coupled to the rinse bowl.

4. The system of claim 3, wherein the robotic arm is adapted to move to a rinse bowl destination location.

5. The system of claim 4, wherein the robotic arm is adapted to selectively decouple from the rinse bowl at the rinse bowl destination location.

6. The system of claim 4, wherein the robotic arm is adapted to invert the rinse bowl at the rinse bowl destination location to empty a content of the rinse bowl.

7. The system of claim 1, wherein the system further comprises one or more additional boiling tanks and one or more additional temperature regulators, each of the one or more additional boiling tanks having one of the one or more additional temperature regulators adapted to elevate the temperature of an additional boiling solution contained therein.

8. The system of claim 1, wherein the system further comprises one or more additional rinsing tanks.

9. The system of claim 1, the first boiling tank further comprising a first boiling tank cover, the first boiling tank cover movable between an open position and a closed position, the first boiling tank cover optionally being dimensioned to form a first seal at least partially with at least one peripheral wall to form a first sealed rinse bowl volume.

10. The system of claim 9, the first boiling tank further comprising a first boiling tank cover actuator coupled to the first boiling tank cover, the first boiling tank cover actuator moving the first boiling tank cover to the open position in response to receiving a boiling tank cover open signal, the first boiling tank cover actuator moving the first boiling tank cover to the closed position in response to receiving a boiling tank cover close signal.

11. The system of claim 10, wherein the silk processing algorithm, when executed by the processor, further causes the processor to: b1) after step b) and after the robotic arm has moved the rinse bowl into the first boiling tank, send the boiling tank cover close signal to the first boiling tank cover actuator; and b4) prior to step c), send the boiling tank cover open signal to the first boiling tank cover actuator.

12. The system of claim 11, the silk processing algorithm, when executed by the processor, further causes the processor to: b3) after steps a) and b1) and prior to step b4), send a boiling tank extraction signal to the robotic arm, wherein the robotic arm moves the rinse bowl toward the first boiling tank cover while engaging and/or retaining the first seal in response to the boiling tank extraction signal, thereby reducing the first sealed rinse bowl volume, thereby squeezing at least a portion of a content of the first sealed rinse bowl volume through the porous bottom surface.

13. The system of claim 1, the silk processing algorithm, when executed by the processor, further causes the processor to: b2) after step b), send a boiling tank agitation signal to the robotic arm, wherein the robotic arm moves the rinse bowl upward and downward at predefined speeds and distances, thereby agitating liquids contained in the rinse bowl volume.

14. The system of claim 1, wherein the first boiling tank further comprises a boiling tank inlet having a boiling tank inlet valve, wherein the boiling tank inlet valve is operable to provide selective fluid communication between a boiling tank solution source and the first boiling tank, wherein the boiling tank solution source is optionally a Na2CO3 solution source.

15. The system of claim 1, wherein the first boiling tank further comprises a boiling tank outlet having a boiling tank outlet valve, wherein the boiling tank outlet valve is operable to drain the first boiling tank.

16. The system of claim 1, the first rinsing tank further comprising a first rinsing tank cover, the first rinsing tank cover movable between an open position and a closed position, the first rinsing tank cover optionally being dimensioned to form a second seal at least partially with at least one peripheral wall to form a second sealed rinse bowl volume.

17. The system of claim 1, the silk processing algorithm, when executed by the processor, further causes the processor to: c4) after step c), send a rinsing tank agitation signal to the robotic arm, wherein the robotic arm moves the rinse bowl upward and downward at predefined speeds and distances, thereby agitating liquids contained in the rinse bowl volume.

18. The system of claim 1, wherein the first rinsing tank further comprises a rinsing tank inlet having a rinsing tank inlet valve and a rinsing tank outlet having a rinsing tank outlet valve, wherein the rinsing tank inlet valve is operable to provide selective fluid communication between a rinsing tank liquid source and the first rinsing tank, wherein the rinsing tank outlet valve is operable to drain the first rinsing tank, the silk processing algorithm, when executed by the processor, further causes the processor to: 1d) after step c) and prior to step d), send rinsing tank drain and refilling signals to the rinsing tank inlet valve and the rinsing tank outlet valve, wherein the rinsing tank inlet valve and the rinsing tank outlet valve operate in concert to empty and refill the first rinsing tank a predetermined number of times at predetermined intervals of time.

19. The system of claim 1, wherein the first boiling tank and the first rinsing tank each have internal surfaces that are chemically and biologically inert relative to a silk fibroin extraction process.

20. The system of claim 1, wherein the rinse bowl has an internal surface and at least a portion of an external surface that are chemically and biologically inert relative to a silk fibroin extraction process.

* * * * *

UNITED STATES PATENT AND TRADEMARK OFFICE
CERTIFICATE OF CORRECTION

| | |
|---|---|
| PATENT NO. | : 11,932,968 B2 |
| APPLICATION NO. | : 17/265381 |
| DATED | : March 19, 2024 |
| INVENTOR(S) | : Iuchi et al. |

It is certified that error appears in the above-identified patent and that said Letters Patent is hereby corrected as shown below:

In the Specification

In Column 8, Line 7, delete "150" and insert --160-- therefor

In the Claims

In Column 11, Line 24, in Claim 14, delete "Na2CO3" and insert --$Na_2CO_3$-- therefor Signed and Sealed this
Tenth Day of September, 2024

*Katherine Kelly Vidal*

Katherine Kelly Vidal
*Director of the United States Patent and Trademark Office*